W. V. D. KELLEY AND C. H. DUNNING.
MOTION PICTURE FILM.
APPLICATION FILED FEB. 10, 1919. RENEWED MAR. 8, 1922.
1,431,309.
Patented Oct. 10, 1922.
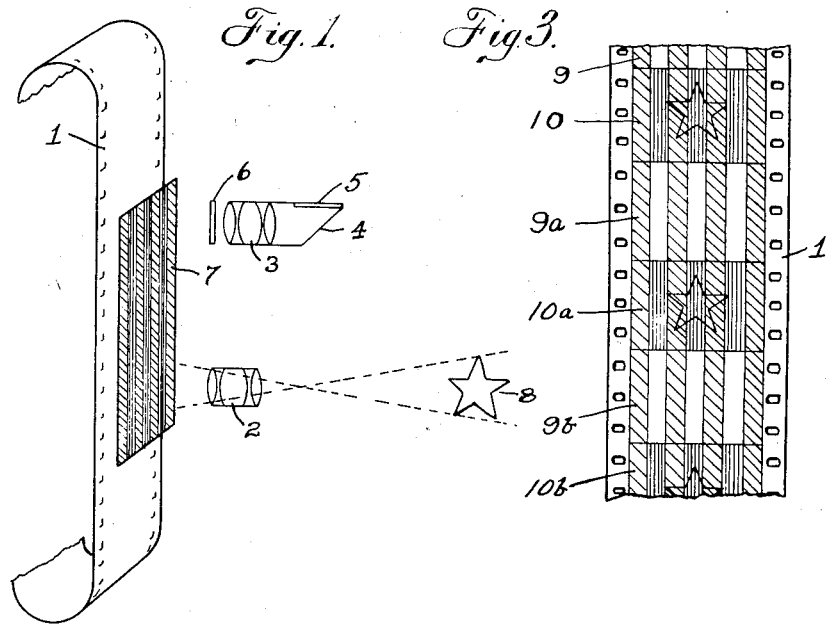
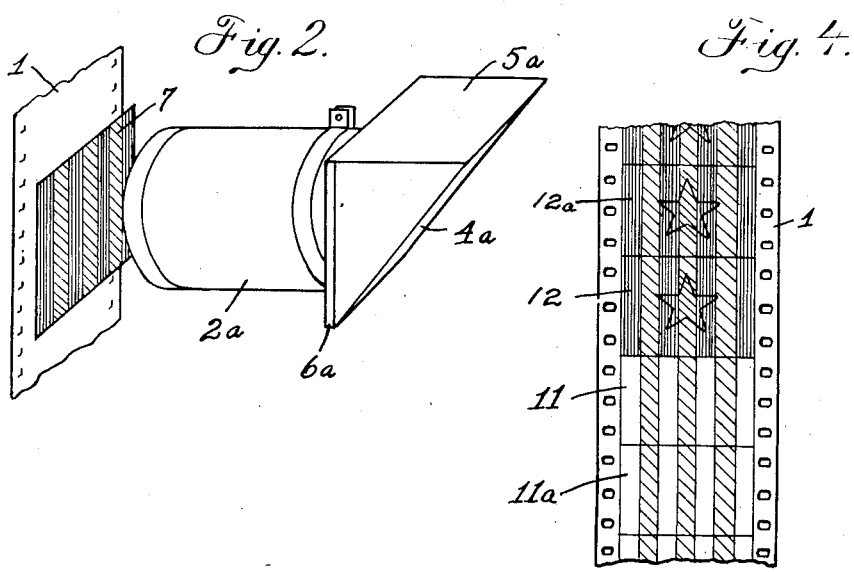
Wm. V. D. Kelley, Inventors
Carroll H. Dunning
By their Attorney
Lewis J. Doolittle Patented Oct. 10, 1922.

1,431,309

UNITED STATES PATENT OFFICE.

WILLIAM V. D. KELLEY, OF NEW YORK, N. Y., AND CARROLL H. DUNNING, OF SOMERVILLE, NEW JERSEY, ASSIGNORS TO PRIZMA INCORPORATED, A CORPORATION OF MAINE.

MOTION-PICTURE FILM.

Application filed February 10, 1919, Serial No. 275,936. Renewed March 8, 1922. Serial No. 542,164.

*To all whom it may concern:*

Be it known that WILLIAM V. D. KELLEY, a citizen of the United States, and resident of the city, county, and State of New York, and CARROLL H. DUNNING, a citizen of the United States, and resident of Somerville, Somerset County, New Jersey, have invented certain new and useful Improvements in Motion-Picture Films, of which the following is a specification.

This invention relates to an improved method of making negative films for use in connection with the production of motion pictures in natural colors.

One of the principal objects of the invention is to provide a method for making color picture negative films which permits the exposure of a picture area in sections and a design area in sections corresponding in arrangement to be made on the same sensitized stock so that, in development, treatment and aging, the color forming sections are subject to the same conditions as the color-value picture records and thus avoid the difficulty of insuring an exact register or relative positioning of the several elements.

A further object or result of the invention is that with this negative film a positive film is produced which may be used in the standard projecting apparatus at the usual speed.

The principal feature of the invention is in the method of exposure and making of the picture and design areas on the same negative strip or film, the same being arranged either in alternate positions, that is, the picture areas alternating with the design areas, or in successive groups.

In our improved method or arrangement, the design and picture areas are photographed in sections through a color screen with the color sections in symmetrical arrangement, the sections of the design areas being subsequently colored, when printed on the positive film, with colors corresponding to the color-values in the picture area sections. The picture areas are exposed through this same screen and carry color-values corresponding to the actual colors of the object photographed. The color record is complete in each picture, which not only permits a slower speed in taking and projecting but avoids the objectionable "color fringe" effects present when only a partial color record is recorded in a single picture and the consequent higher speed necessary in such cases.

In carrying this into operation in the preparation of the negative film the camera is arranged to make two exposures simultaneously on two film areas, the film advancing mechanism being arranged to advance the film two areas at a time instead of one. One of these exposures photographs the object in the usual manner, through the screen color filter arranged in a symmetrical design and impressing the complete color-values thereof on each one of the film areas thus exposed, which are hereinafter referred to as the picture areas, and the other exposure made through the same screen color filter to a suitable source of light, such as the sky, the light passing through an auxiliary color filter which permits only a predetermined number of the design elements of the screen to be photographically exposed in producing the design areas on the film, as will be explained more fully hereinafter.

In this arrangement the design areas will alternate with the picture areas on the negative film and when printed on the positive film the design sections are colored with colors corresponding to the color-values of the picture sections.

Instead of arranging the exposure of the picture and design areas alternately on the negative film a series of successive picture areas may be exposed followed by a series of successive design areas, or vice-versa, both series being exposed on the same strip of film and developed, etc., under the same conditions.

The design screen may provide for any number of colors desired, depending upon the subject, for instance, in two color work red and green-blue; in three color work, red, green and blue and in four color work, red, green, yellow and blue. These colors are arranged in sections in the design areas in any desired symmetrical arrangement, such as squares, lines, etc., which are capable of uniform reproduction over the entire surface. When the two-color line arrangement of the screen is used the red lines may be equal in size to the green-blue lines or may be varied in accordance with the projection requirements as to brilliancy, etc. This also applies to the other arrangements of the colors.

We have found that where the color-values are recorded in the negative correctly, regardless of the number of sub-divisions of the spectrum used in obtaining this correct negative recording, that it is possible to reproduce them satisfactorily with but two colors used in projecting. For instance, we may use in taking the picture a screen in which the usual three color-values are represented by red, green and blue-violet and in projecting use a complementary set of red-orange and blue-green.

The positive film used for projecting the pictures is preferably a double coated film and is printed on one side in successive areas from the alternate picture areas of the negative film and on the opposite side the successive areas, which of course register with the picture areas on the first side, from the alternate design areas of the negative film, these successive design area sections on one side being then colored to correspond with the color-values of the picture area sections opposite thereto. The printing apparatus when the alternate arrangement of the negative film is used, is arranged to advance the negative film two areas while advancing the positive film one area, as will be readily understood.

Referring now to the drawings, in which some of the possible arrangements for carrying out our invention are illustrated:

Fig. 1 is a diagrammatic illustration of an arrangement for the simultaneous exposure of the picture and design areas alternating in position on the negative film.

Fig. 2 is a diagrammatic illustration of an arrangement for exposing a series of successive picture areas and a series of successive design areas on the same film.

Fig. 3 illustrates a section of the negative film produced by the arrangement shown in Fig. 1.

Fig. 4 is an illustration of a portion of the negative film produced by the arrangement shown in Fig. 2.

Referring to Figs. 1 and 3, a panchromatic negative film is shown at 1 and the usual objective lens indicated at 2. A second lens is indicated at 3 and is provided with an angular mirror 4 and groundglass 5 arranged to permit the light only from the sky or other suitable source to pass through lens 3 and an auxiliary color filter 6, through the design screen 7, making the exposure for the design areas on the negative film 1.

The object to be photographed, indicated at 8, is photographed through the objective lens 2 and design screen 7 upon the picture areas of the negative film 1. In this arrangement both of these exposures are made simultaneously through the design screen 7, the negative film 1 being advanced two areas for each of these successive double exposures, thus producing on the negative film an alternate arrangement of the picture and design areas, as indicated in Fig. 3. The design areas are indicated at 9, 9$^a$, 9$^b$, etc., and the picture areas at 10, 10$^a$, 10$^b$, etc.

The design screen 7 in this illustration is composed of alternate lines colored red and green-blue and thus forms a two-color line filter which causes a full color record of the objective 8 to be impressed upon the picture area 10 in sections composed of alternate lines extending longitudinally along the picture areas.

The exposure of the design areas is made through this same color filter screen 7 but the light passes through an auxiliary color filter 6 which, in this case as illustrated, carries a color which is complementary to one of the two colors of the design screen 7. For instance, a color complementary to the red lines, which results in the photographing (in color-value) of the green lines only, alternately positioned with the unexposed red lines of the screen 7, the red of these lines in the design areas in combination with the green-blue of the auxiliary color filter 6 absorb all the light and no photographic record is impressed on the negative behind these red lines on the design areas.

In the arrangement shown in Figs. 2 and 4 a series of successive picture areas are exposed in the usual manner through the objective lens 2 (except that the same are photographed through the color screen 7) and then, preferably on the same strip of film, a second series of design areas are exposed through the same screen 7. The arrangement shown in Fig. 2 illustrates how an attachment for this exposure may be placed upon the lens 2$^a$ after the picture has been photographed. This attachment consists of a mirror 4$^a$, ground glass 5$^a$ and an auxiliary color filter 6$^a$, which operate for these exposures the same as described in connection with Fig. 1.

This produces a series of design areas 11, 11$^a$, etc., and a series of picture areas 12, 12$^a$, etc., on the same film, as illustrated in Fig. 4.

Either arrangement of the negative film thus produced is then used as heretofore described to print the double coated positive film with the picture areas on one side and the design areas on the opposite side. The lines of the design area section opposite the red color-value lines of the picture areas will print in black on the positive film and these lines are converted or dyed with a suitable red color, (as by using a uranium salt, or by bleaching and dying red,) while the alternate lines are dyed, in the gelatine, to green-blue, (as by using the dye known as "acid green L",) thus providing the colors to serve the corresponding color-value lines of the picture areas and, as each picture area, as already explained, contains a full color record of the object, the picture will be projected in its natural colors.

As many changes could be made in the above construction and many apparently widely different embodiments of our invention designed without departing from the scope of the appended claims, we intend that all matter contained in the above description or shown in the accompanying drawings shall be interpreted as illustrative merely of an operative embodiment of our invention and not in a limiting sense.

What we claim is:—

1. The method of making negative films which consists in producing color-value sectional picture records in one series of film areas and corresponding sectional design records in another series of film areas.

2. The method of making color picture negative films which consists in producing exposures on the same film of a picture area in sections and a design area in sections corresponding in arrangement.

3. The method of making color picture negative films which consists in producing exposures on the same film of a picture area and a design area, impressing on said picture area a record of the object in a plurality of color-value sections through a color screen, and impressing a record of a predetermined number of said color-value sections on said design area through said color screen.

4. The method of making color picture negative films which consists in producing exposures on the same film of a series of picture areas and a series of design areas, impressing on each of said picture areas a record of the object in a plurality of color-values through a color screen, and impressing a record of a predetermined number of said color-values on each of said design areas through said color screen.

5. The method of making color picture negative films which consists in producing exposures on the same film of a series of alternately arranged picture and design areas, impressing on each of said picture areas a record of the object in a plurality of color-values through a color screen, and impressing a record of a predetermined number of said color-values on each of said design areas through said color screen.

6. The method of producing color picture films which consists in exposing the film through a screen composed of symmetrically arranged complementary colors to produce a series of picture areas in sections and design areas in sections, and causing one of said color-values to be recorded in each of said design areas in the same relative position as the same is recorded in the corresponding color-value picture.

7. The method of producing color picture films which consists in photographing the picture on a film in a series of areas in sections of symmetrically arranged complementary color-values, and exposing a second series of areas in sections through a screen design corresponding to said picture sections on the same side of said film.

8. The method of producing color picture films which consists in simultaneously photographing the picture in alternate areas in sections of symmetrically arranged complementary color-values on one side of a film and exposing the areas alternating with said picture areas on said film through a screen corresponding to the color-value arrangement of the alternating picture area sections.

9. The method of making negative films which consists in recording both the color-value records of the picture and a record of the elements of the filter screen on the same negative strip, the said picture records being exposed in one series of areas and the screen filter records in another series of areas on the film.

10. The method of making color picture negative films which consists in producing exposures on the same film of a picture area and a design area, impressing on said picture area a record of the object in a plurality of color-value sections through a color screen, and impressing a record of a predetermined number of said color-value sections on said design area through said color screen and an auxiliary screen complementary in color to one of the colors of said color screen.

11. A color picture film carrying a series of picture areas of symmetrically arranged complementary color-values in each picture area and a second series of areas having a design corresponding to the color-value arrangement of the picture areas.

12. A color picture film carrying a series of picture areas of complementary color-values and a series of design areas alternately arranged with said picture areas and having a design corresponding to the color-value arrangement of said picture areas.

Signed at the city, county and State of New York, this 6th day of Feb., 1919.

WILLIAM V. D. KELLEY.
CARROLL H. DUNNING.